United States Patent
Kurosawa

(10) Patent No.: US 7,550,942 B2
(45) Date of Patent: Jun. 23, 2009

(54) HYBRID POWER SUPPLY SYSTEM AND CONTROLLER FOR WARM-UP MODE

(75) Inventor: Atsushi Kurosawa, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 224 days.

(21) Appl. No.: 11/614,786

(22) Filed: Dec. 21, 2006

(65) Prior Publication Data

US 2007/0231626 A1    Oct. 4, 2007

(30) Foreign Application Priority Data

Dec. 21, 2005    (JP) .............................. 2005-367419

(51) Int. Cl.
*H01M 10/46* (2006.01)
(52) U.S. Cl. ...................................... 320/101
(58) Field of Classification Search .................. 320/101, 320/104, 107, 112, 114, 150; 429/12, 13, 429/24
See application file for complete search history.

(56) References Cited

U.S. PATENT DOCUMENTS

| | | | |
|---|---|---|---|
| 4,670,702 A | 6/1987 | Yamada |
| 5,193,635 A | 3/1993 | Mizuno |
| 5,789,092 A | 8/1998 | Spiers |
| 6,155,369 A | 12/2000 | Whittaker |
| 6,326,765 B1 | 12/2001 | Hughes |
| 6,500,573 B1 | 12/2002 | Simazu |
| 2002/0039674 A1 | 4/2002 | Suzuiki |
| 2002/0192520 A1 | 12/2002 | Nonobe |
| 2003/0094324 A1 | 5/2003 | Huang |

(Continued)

FOREIGN PATENT DOCUMENTS

DE    10328582    1/2004

(Continued)

OTHER PUBLICATIONS

European Search Report for European Application No. EP 06 02 6330 dated Mar. 29, 2007.

(Continued)

*Primary Examiner*—Edward Tso
(74) *Attorney, Agent, or Firm*—Keating & Bennett, LLP

(57) ABSTRACT

A hybrid power supply system having a fuel cell and a secondary power storage device is used as the power source of a drive motor for a motorcycle. Oxygen supplied from an air blower and hydrogen gas supplied from a hydrogen tank react with each other in the fuel cell to generate electric power. In a warm-up mode, where a temperature of the fuel cell is below a threshold temperature, the fuel cell generates more power than is to be consumed by the drive motor, and the surplus power is used to charge the secondary power storage device. In a normal operation mode, after the warm-up of the fuel cell is completed, the electric power generated by the fuel cell is smaller than the power consumed by the drive motor, and the secondary power storage device supplements the power provided by the fuel cell to meet the power requirement of the drive motor. The hybrid power supply system thus decreases the time needed to warm-up the fuel cell and uses the electric power generated by the fuel cell more efficiently.

20 Claims, 8 Drawing Sheets

U.S. PATENT DOCUMENTS

| | | |
|---|---|---|
| 2004/0050606 A1 | 3/2004 | Yang |
| 2004/0144579 A1 | 7/2004 | Hasuka |
| 2004/0197610 A1* | 10/2004 | Drunert ............... 429/13 |
| 2005/0053814 A1 | 3/2005 | Imamaura |
| 2006/0040149 A1* | 2/2006 | Aso et al. ............... 429/13 |
| 2007/0084654 A1 | 4/2007 | Kobayashi |
| 2007/0092764 A1 | 4/2007 | Kobayashi |
| 2007/0166584 A1 | 7/2007 | Kurosawa |
| 2007/0248857 A1 | 10/2007 | Kurosawa |
| 2008/0093148 A1 | 4/2008 | Takahashi |

FOREIGN PATENT DOCUMENTS

| | | |
|---|---|---|
| EP | 1 091 436 | 4/2001 |
| EP | 1132251 | 9/2001 |
| EP | 1164049 | 12/2001 |
| EP | 1251022 | 10/2002 |
| EP | 1389552 | 2/2004 |
| EP | 1398263 | 3/2004 |
| EP | 1533173 | 5/2005 |
| FR | 2875749 | 3/2006 |
| JP | 8-119180 | 5/1996 |
| JP | 10 271706 | 10/1998 |
| JP | 2000-243418 | 9/2000 |
| JP | 2001-130468 | 5/2001 |
| JP | 2002 034171 | 1/2002 |
| JP | 2002-313388 | 10/2002 |
| JP | 2002-362470 | 12/2002 |
| JP | 2005-104494 | 4/2005 |
| JP | 2005-112095 | 4/2005 |
| WO | WO 2005-099016 | 10/2005 |

OTHER PUBLICATIONS

European Search Report for European Application No. EP 06020880 dated Jan. 31, 2007.

European Search Report for European Application No. EP 06020184 dated Feb. 1, 2007.

European Search Report for European Application No. EP 07008149 dated Nov. 6, 2007.

* cited by examiner

[FIG. 1]
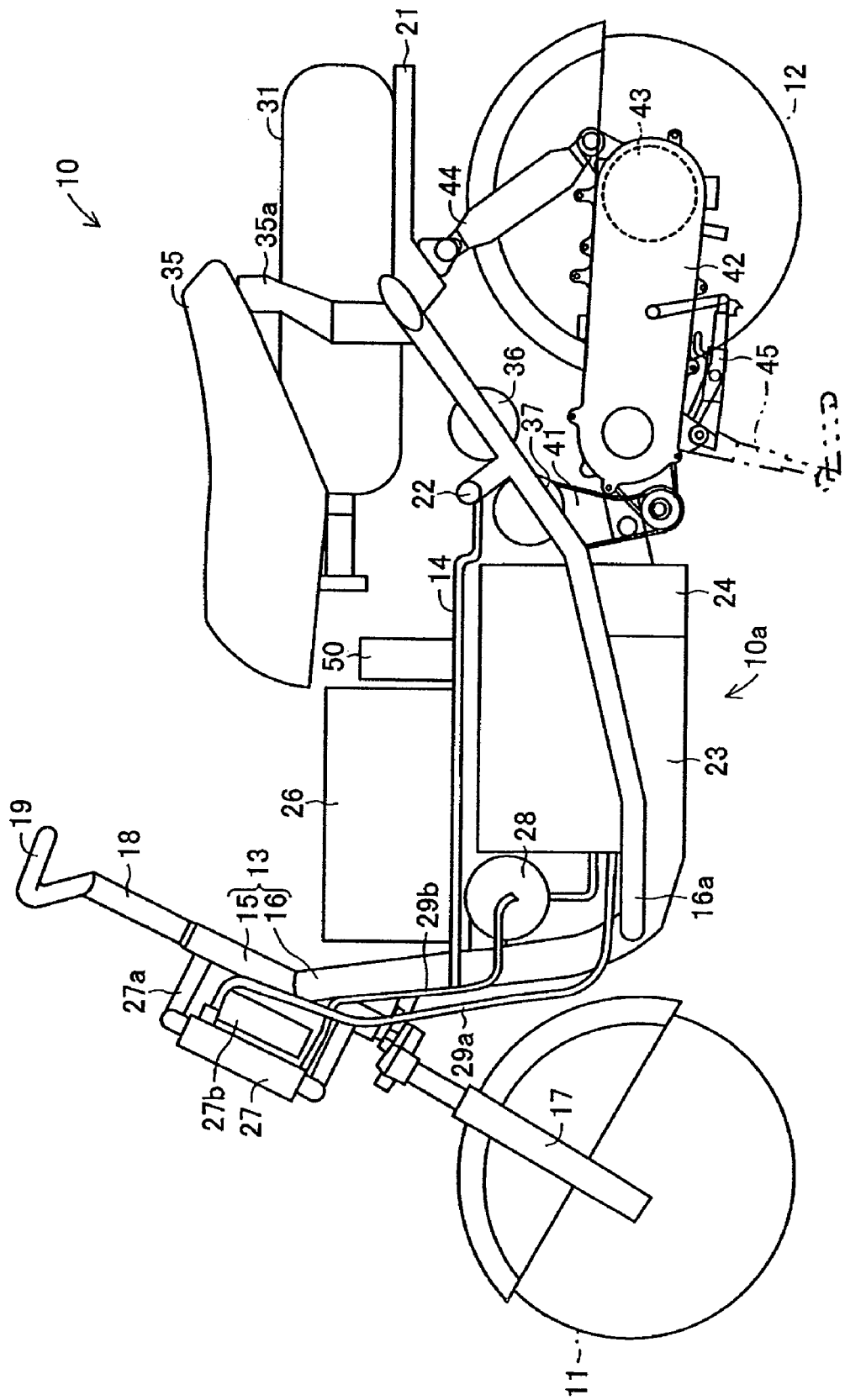

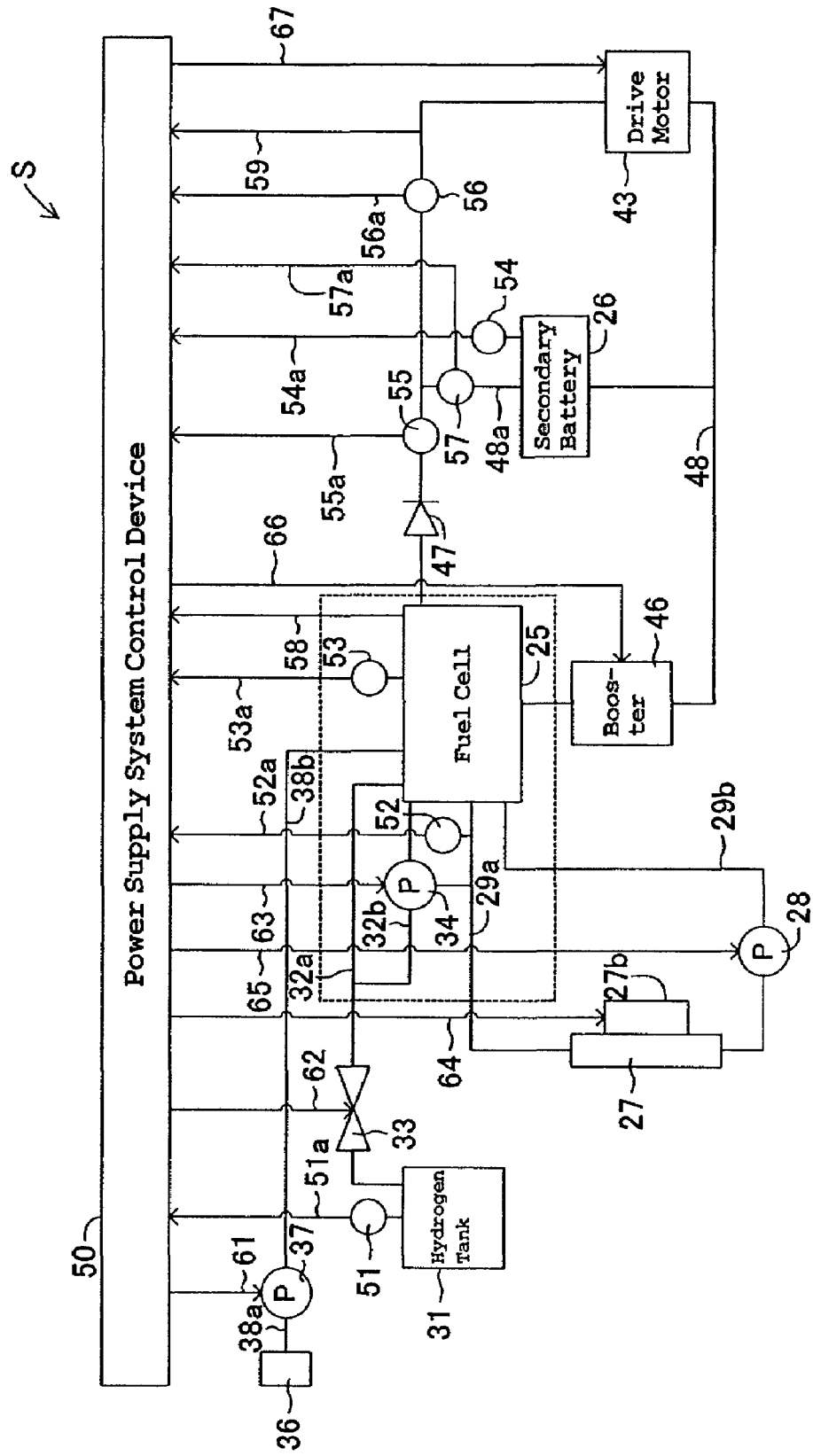
[FIG. 2]

[FIG. 3]
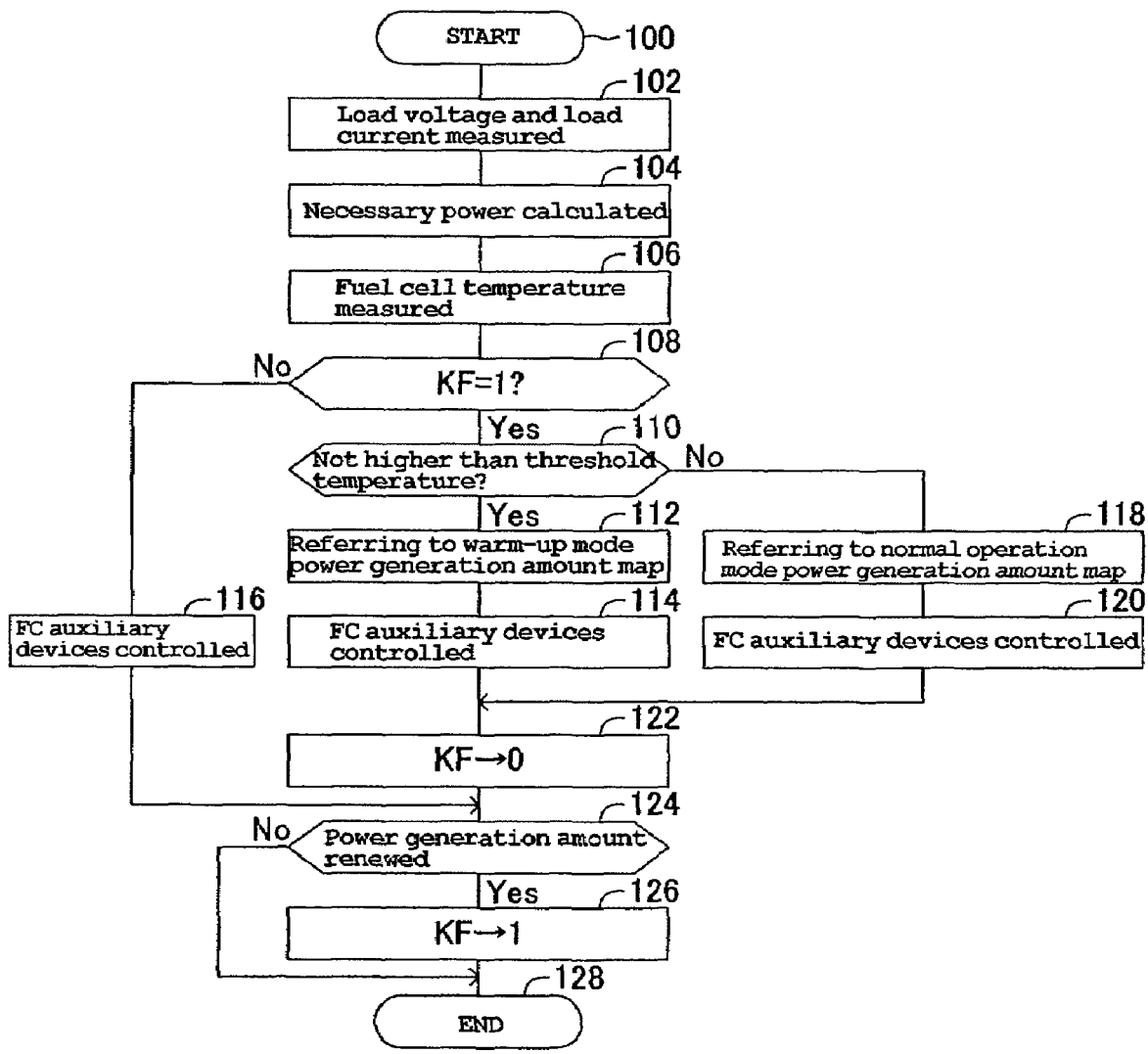

[FIG. 4]
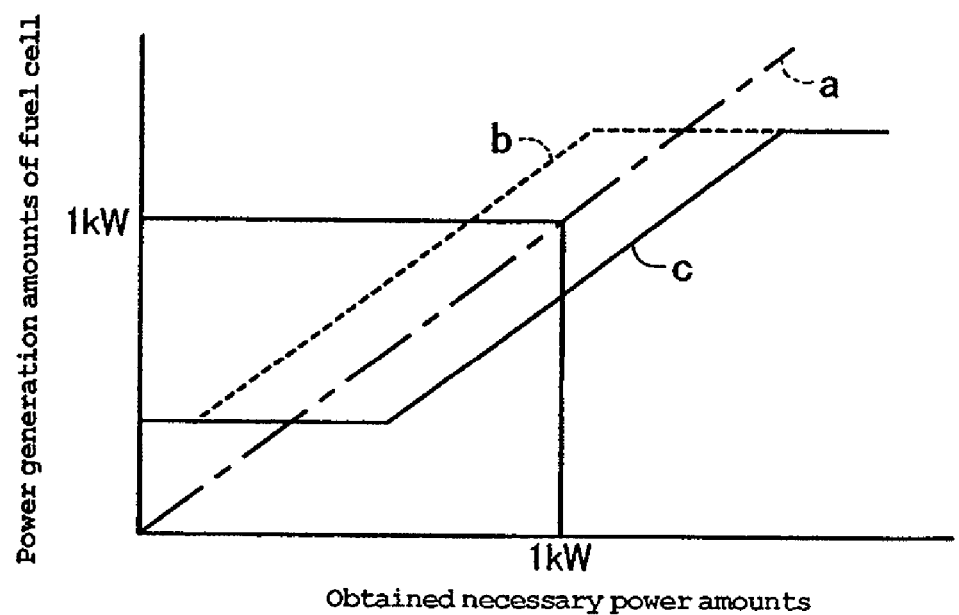

[FIG. 5]
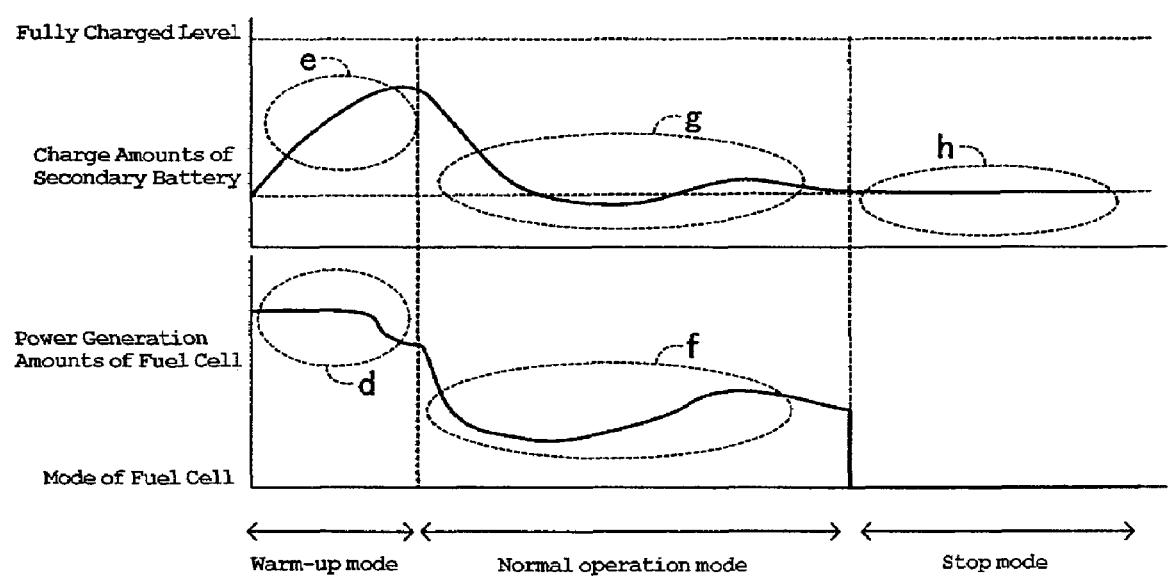

[FIG. 6]
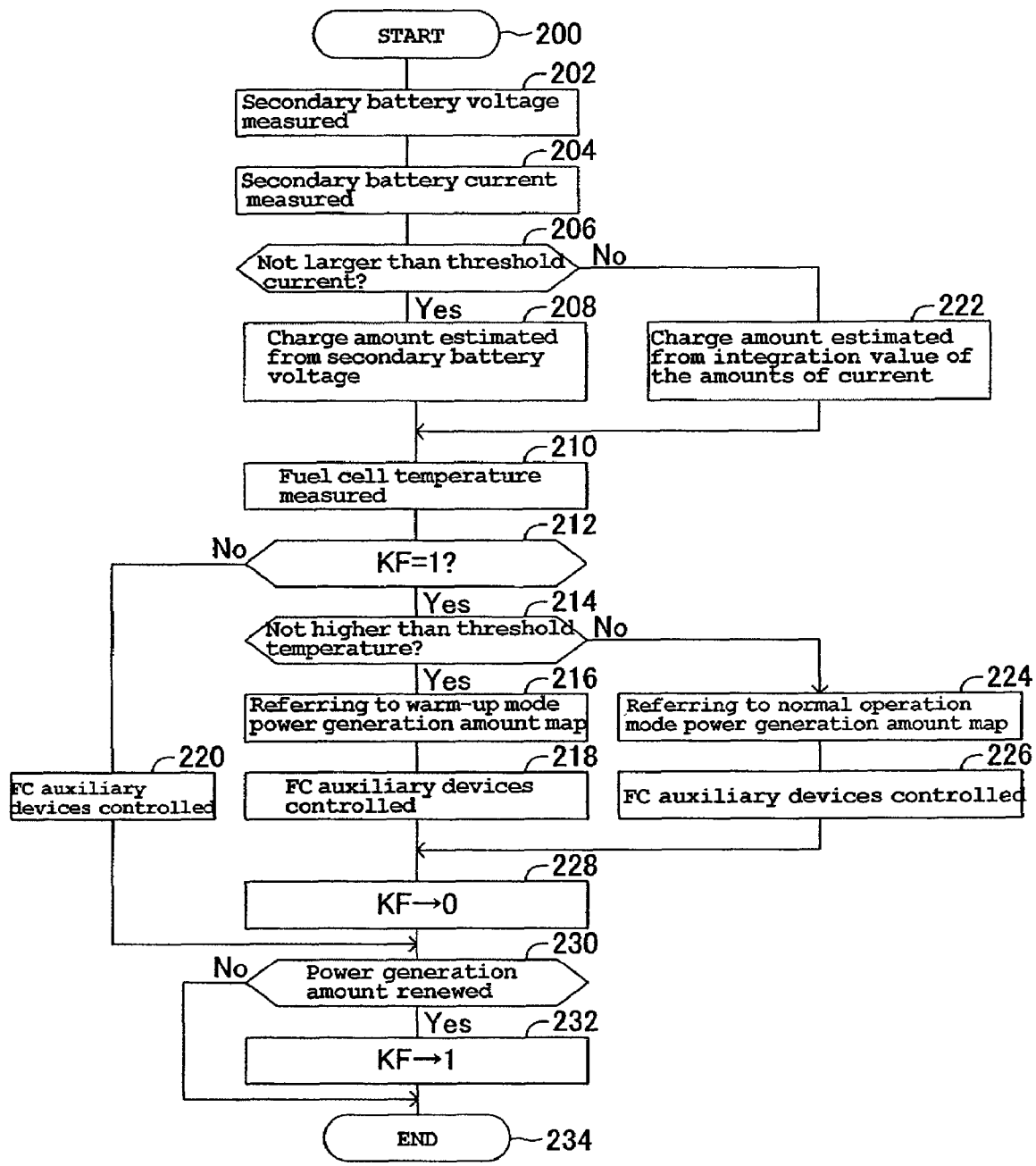

[FIG. 7]
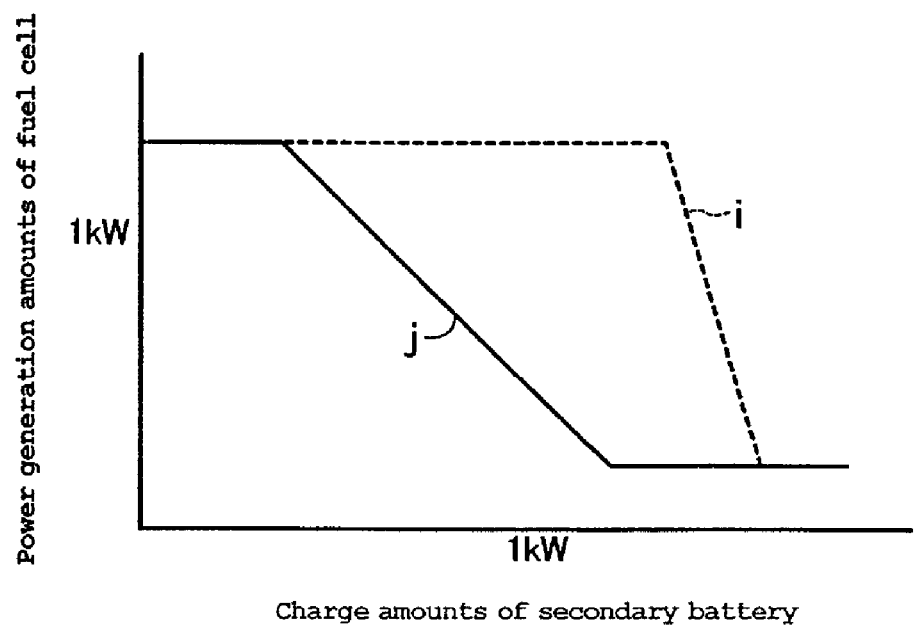

[FIG. 8]
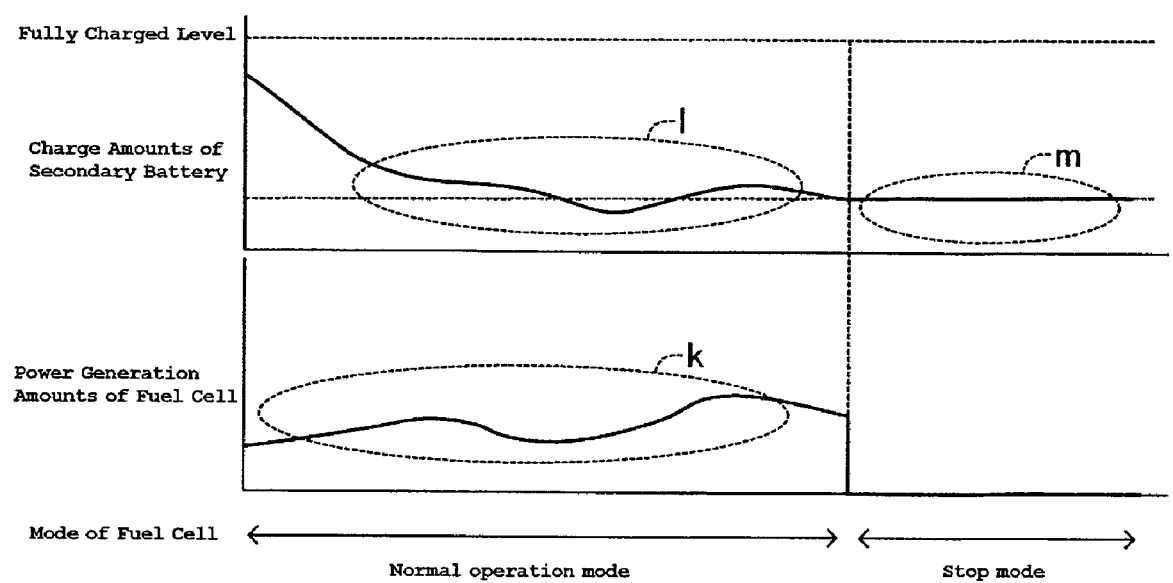

HYBRID POWER SUPPLY SYSTEM AND CONTROLLER FOR WARM-UP MODE

CROSS-REFERENCE TO RELATED APPLICATIONS

The present application is based on and claims priority under 35 U.S.C. § 119 to Japanese Patent Application No. 2005-367419, filed on Dec. 21, 2005, the entire contents of which is expressly incorporated by reference herein.

BACKGROUND OF THE INVENTION

1. Field of the Invention

The present invention relates to a hybrid power supply system, and more specifically to a hybrid power supply system having a fuel cell and a secondary power storage device.

2. Description of the Related Art

Conventionally, vehicles such as, for example, automobiles include a fuel cell electric vehicle that runs using electric power generated by a fuel cell. In such a fuel cell electric vehicle, temperatures between 70° C. and 80° C. generally provide a suitable temperature range for the fuel cell to generate electric power. Therefore, it is necessary to raise the temperature of the fuel cell to the suitable temperature range as soon as possible. For this purpose, the fuel cell is warmed up in a short time. In order to warm up the fuel cell in a short time, a hybrid power supply device is provided that has a heater heats a coolant of the fuel cell to shorten the warm-up time.

However, such a hybrid power supply device is expensive and more bulky because of the addition of the heater to warm-up the fuel cell. There is another fuel cell electric vehicle, disclosed in Japanese Publication No. JP 2002-313388, in which the warm-up of the fuel cell, which is necessary when the fuel cell is started under a low temperature condition, is achieved by controlling the fuel cell in such a manner that the power generating efficiency is decreased more than that of a normal operation mode. That is, in this fuel cell electric vehicle, an amount of heat is increased by the power generating efficiency being decreased to shorten the warm-up time.

However, because the fuel cell of the conventional fuel cell electric vehicle described above is only allowed to generate electric power corresponding to the power required by the vehicle, the warm-up time is not greatly shortened. Also, if the power required by the vehicle fluctuates largely, the hydrogen and oxygen gases need to be instantly supplied in sufficient volume so that the fuel cell generates the power corresponding to the requirement. Respective supply devices thereof thus are upsizing.

SUMMARY OF THE INVENTION

In view of the circumstances above, an aspect of at least one of the embodiments disclosed herein is to provide a hybrid power supply system that can shorten a warm-up time of a fuel cell and to more efficiently use the electric power generated by the fuel cell.

In accordance with one aspect of the invention, a hybrid power supply system is provided, comprising a fuel cell configured to react hydrogen gas supplied from a hydrogen supply device with oxygen gas supplied from an oxygen supply device to generate electric power. The system also comprises an operating device electrically connected to the fuel cell, the operating device operated using the electric power generated by the fuel cell, a cooling device delivering a coolant to the fuel cell to cool the fuel cell, and a temperature monitor sensing a temperature of the fuel cell or a temperature of the coolant. A controller is configured to control the electric power generated by the fuel cell in such a manner that the generated electric power is larger than electric power consumed by the operating device during a warm-up mode in which the temperature sensed by the temperature monitor is not higher than a predetermined threshold temperature. The system also comprises a secondary power storage device electrically connected to the fuel cell and the operating device, whereby a supply of electric power generated by the fuel cell and not consumed by the operating device is used to charge the secondary power storage device.

In accordance with another aspect of the invention, a hybrid power supply system is provided. The system comprises a fuel cell configured to react hydrogen and oxygen to generate electric power, a drive motor coupled to the fuel cell, the drive motor configured to operate using electric power generated by the fuel cell, and a temperature sensor configured to measure a temperature of the fuel cell. The system also comprises a controller configured to control the operation of the fuel cell so that the electric power generated by the fuel cell is larger than the electric power demand of the drive motor during a warm-up mode in which the measured temperature is at or below a predetermined threshold temperature, and a secondary power storage device electrically connected to the fuel cell and the drive motor.

In accordance with still another aspect of the invention, a method for operating a hybrid power supply system having a fuel cell is provided. The method comprises sensing a temperature of the fuel cell, determining if the sensed fuel cell temperature is not above a threshold temperature, and determining an electric power generation amount for the fuel cell using a warm-up mode power generation map if the sensed temperature is not above the threshold temperature.

BRIEF DESCRIPTION OF THE DRAWINGS

These and other features, aspects and advantages of the present inventions will now be described in connection with preferred embodiments, in reference to the accompanying drawings. The illustrated embodiments, however, are merely examples and are not intended to limit the inventions. The drawings include the following 8 figures.

FIG. 1 is a perspective schematic view of a motorcycle having one embodiment of a hybrid power supply system;

FIG. 2 is a block diagram of one embodiment of a hybrid power supply system;

FIG. 3 is a flowchart, showing a program for a fuel cell to generate electric power based on an amount of required power for one embodiment of a hybrid power supply system;

FIG. 4 is a graph, showing the relationship between the required power generation amount and the power generation amount for one embodiment of a hybrid power supply system;

FIG. 5 is a graph, showing the charge amount of a secondary battery and the power generation amount in response to various operating modes of the fuel cell for one embodiment of a hybrid power supply system;

FIG. 6 is a flowchart, showing a program for the fuel cell to generate electric power based on the discharge amount of the secondary battery for one embodiment of a hybrid power supply system;

FIG. 7 is a graph, showing the relationship between the discharge amount of the secondary battery and power generation amount of the fuel cell for one embodiment of a hybrid power supply system; and FIG. 8 is a graph, showing the charge amount of the secondary battery and the power generation amount of the fuel cell when the charge amount of the secondary battery is larger than a predetermined amount for one embodiment of a hybrid power supply system.

DETAILED DESCRIPTION OF THE PREFERRED EMBODIMENT

As used herein, "secondary power storage device" means a power storage device (e.g., a battery) coupled to an operating device (e.g., an electric motor) to supplement power from a primary power supply (e.g., a fuel cell).

FIG. 1 shows a motorcycle 10 having a hybrid power supply system (see FIG. 2), in accordance with one preferred embodiment of the invention. This motorcycle 10 includes a pair of wheels, which are a front wheel 11 and a rear wheel 12, and a vehicle body 10a to which the pair of wheels are mounted for rotation. The vehicle body 10a includes a vehicle body frame 13 forming the major part of the vehicle body 10a and a sub frame 14 detachably mounted to the vehicle body frame 13. The vehicle body frame 13 includes a head pipe 15 forming the front portion of the vehicle body 10a and a down tube 16 extending rearward from the head pipe 15.

The front wheel 11 is rotatably supported at the lower end of a front fork 17 whose lower portion is bifurcated. That is, the lower ends of the front fork 17 support the central shaft (not shown) of the front wheel 11 to allow rotation of the wheel 11 about the shaft. The bottom end of a steering shaft 18 disposed within the head pipe 15 is coupled with the top end of the front fork 17. The steering shaft 18 is inserted into the head pipe 15 so that the steering shaft 18 is pivotable about the axis of the head pipe 15. The top portion of the steering shaft 18 protrudes upwardly from the head pipe 15. Handlebars 19 extending generally horizontally are coupled with the top portion of the steering shaft 18.

Therefore, when the handlebars 19 are pivoted about the axis of the steering shaft 18, the front wheel 11 changes its direction rightward or leftward about the axis of the front fork 17 in accordance with a pivotal amount of the steering shaft 18. Each of the right and left ends of the handlebars 19 has a grip (not shown), which can be gripped by a user's hand. One of the grips is attached for pivotal movement about the axis thereof and defines an accelerator for adjusting the drive power of a drive motor 43 (discussed further below). The other grip is fixed to the handlebars 19. Brake levers (not shown) are disposed adjacent to the respective grips. The brake levers are urged to be spaced apart from the respective grips, and restrain the rotations of the front wheel 11 and the rear wheel 12 by being pulled toward the grips.

The down tube 16 includes a pair of main frames 16a (only one of them is shown) which extend downwardly and rearwardly from the junction with the head pipe 15, while widening the distance therebetween. Further, rear portions of the respective main frames 16a extend obliquely rearward and upward while keeping a substantially constant distance therebetween. The rear ends of the respective main frames 16a are coupled with a plate-like attaching member 21 that extends horizontally.

With continued reference to FIG. 1, a cross member 22 extends between the top surfaces of the rear portions of the respective main frames 16a. Each end portion of the cross member 22 generally turns at substantially a right angle to configure a generally C-channel. The ends of the cross member 22 are coupled with the respective main frames 16a so that a body portion protrudes upward from both of the main frames 16a. A positioning base 23 extends between the bottom ends of the respective main frames 16a and protrudes downward therefrom. The top surface of the positioning base 23 can be formed as a recess, which receives a fuel cell container 24 therein. A fuel cell 25 (see FIG. 2) is contained in the interior of the fuel cell container 24.

The sub frame 14, which has a plate-like shape, is mounted between the down tube 16 and the cross member 22. A secondary power storage device 26 is fixed to the top surface of the sub frame 14 at a location slightly forward of the center portion of the sub frame 14. In the illustrated embodiment, the secondary power storage device 26 is a secondary battery 26, which can be a lithium ion battery. A power supply system control device 50 can be fixed to the top surface of the sub frame 14, and is positioned between the secondary battery 26 and the cross member 22 in the illustrated embodiment.

A radiator 27 is attached to the front portion of the head pipe 15 via attaching members 27a. A fan 27b for air-cooling the radiator is attached to the rear side of the radiator 27 (between the radiator 27 and the head pipe 15). A water pump 28 is positioned between the fuel cell container 24 and the down tube 16, and also below the sub frame 14 (the secondary battery 26). The radiator 27 and the fuel cell 25 are connected to each other by a coolant delivery pipe 29a through which coolant flows from the fuel cell 25 to the radiator 27. The coolant delivery pipe 29a extends from the fuel cell 25 to the radiator 27, running along the down tube 16 and below the subframe 14.

Another coolant delivery pipe 29b extends from the radiator 27 to the water pump 28 through which the coolant flows from the radiator 27 to the fuel cell 25. The coolant delivery pipe 29b further extends from the water pump 28 to the fuel cell 25 through a front surface of the fuel cell container 24. Thus, the operation of the water pump 28 provides coolant from the radiator 27 to the fuel cell 25 by way of the coolant delivery pipe 29b to cool the fuel cell 25. After absorbing the heat while cooling down the fuel-cell system 25, the cooling water can be returned to the radiator 27 by way of the cooling water pipe 29a and can be cooled down by the fan 27b while passing through the radiator 27.

With continued reference to FIG. 1, a hydrogen tank 31 which, can be filled with hydrogen to be supplied to the fuel cell 25 and functions as a hydrogen supply device, can be installed on the top surface of an attaching member 21 coupled with rear end portions of the respective main frames 16a. As shown in FIG. 2, the hydrogen tank 31 is connected to a hydrogen gas supply port of the fuel cell 25 through a gas delivery pipe 32a. Also, a hydrogen gas discharge port of the fuel cell 25 is connected to a portion of the gas delivery pipe 32a through the gas delivery pipe 32b. A valve 33 for selectively opening and closing the gas delivery pipe 32a is placed near the hydrogen tank 31 in the gas delivery pipe 32a. A circulating pump 34 is placed in the gas delivery pipe 32b for returning the hydrogen gas discharged through the hydrogen gas discharge port of the fuel cell 25 to the gas delivery pipe 32a.

Therefore, operating the circulating pump 34 with the valve 33 open allows the hydrogen gas in the hydrogen tank 31 to be supplied to the fuel cell 25 through the gas delivery pipe 32a. The remaining hydrogen gas, which has not reacted in the fuel cell 25, returns to the gas delivery pipe 32a through the gas delivery pipe 32b and mixes with the hydrogen gas flowing from the hydrogen tank 31 to the fuel cell 25 via the gas delivery pipe 32a. The hydrogen gas circulates in the gas delivery pipes 32a, 32b until both the hydrogen gas and oxygen gases react in the fuel cell 25.

As shown in FIG. 1, a seat 35 is disposed above a front section of the hydrogen tank 31. The seat 35 is coupled with the rear portions of the respective main frames 16a via support members 35a.

An air filter 36 can be installed rearwardly of the cross member 22 and attached to the rear portions of both main frames 16a. An air blower 37 can be installed forwardly of the cross member 22 and likewise attached to the rear portions of the main frames 16a. Additionally, positioning bases (not shown) are disposed between the respective main frames 16a in the rear portions of the main frames 16a. The air filter 36 and the air blower 37 are fixed to the down tube 16 via the positioning bases.

The air filter 36 and the air blower 37, as well as the air blower 37 and the fuel cell 25, are connected to each other through gas delivery pipes 38a, 38b, respectively (see FIG. 2). Outside air is sucked in by the air blower 37 through the air filter 36 and introduced into the fuel cell 25. Foreign matter in the outside air is removed as the air passes through the air filter 36. A rear arm (not shown) formed with a pair of rearward-extending arm members is coupled with lower sections of the rear portions of the respective main frames 16a through a coupling unit 41.

Rear end portions of the respective arm members of the rear arm rotatably support lateral side portions of a center shaft of the rear wheel 12; thereby, the rear wheel 12 is rotatable about an axis of the center shaft. A motor unit 42 is mounted to an outer surface of one of the arm members of the rear arm in such a manner that the motor unit 42 covers the arm member. The motor unit 42 accommodates a drive motor 43, which can be an electric motor that operates with the electricity generated by the fuel cell 25, and reduction gears. The operation of the drive motor 43 rotates the rear wheel 12 to propel the motorcycle 10.

Shock absorbers 44 can be placed across the rear ends of the down tube 16 and the upper rear ends of the rear arm, respectively. The rear ends of the rear arm can be structured to allow a swinging motion of the arm via the telescopic movement of the shock absorbers 44. A drum brake (not shown) can be attached to an inner surface of the motor unit 42. The drive motor 43 can operate in proportion to the degree the grip in the handlebar 19 is turned under the control of a controller 50 (power supply system control device), to automatically generate the driving force on the rear wheel 12.

With continued reference to FIG. 1, the motorcycle 10 can be provided with a rotary stand 45 for keeping the motorcycle 10 in an upright position when the motorcycle 10 is stopped. The stand 45 can be raised when the motorcycle 10 runs as indicated by the solid line in FIG. 1, while the stand 45 can be lowered to support the motorcycle 10 when the motorcycle 10 is stopped, as indicated by the chain double-dashed line in FIG. 1.

In the illustrated embodiment, the hybrid power supply system S includes a booster 46 for boosting voltage generated by the fuel cell 25, and a diode 47 for preventing current from flowing back to the fuel cell 25. The fuel cell 25, the secondary battery 26, the drive motor 43, the booster 46, the diode 47 and wiring that connects them to each other together form an electric circuit 48. The respective devices forming the hybrid power supply system S have various sensors for detecting various operating conditions thereof. Electric wiring connects the sensors and the power supply system control device 50.

In the embodiment illustrated in FIG. 2, the hydrogen tank 31 has a residual amount detecting sensor 51 for detecting a residual amount of hydrogen within the hydrogen tank 31. The coolant delivery pipe 29a has a temperature sensor 52 for detecting a temperature of the coolant that is delivered from the radiator 27 to the fuel cell 25 and is returned from the fuel cell 25 to the radiator 27 after cooling the fuel cell 25. The fuel cell 25 has a temperature sensor 53 for detecting a temperature of the fuel cell 25. The secondary battery 26 has another temperature sensor 54 for detecting a temperature of the secondary battery 26. The electric circuit 48 has a current sensor 55 for detecting an amount of current that flows through the electric circuit 48 and another current sensor 56 for detecting an amount of current that flows through the drive motor 43. The wiring 48a connected to the secondary battery 26 in the electric circuit 48 has a further current sensor 57 for detecting an amount of current that flows through the secondary battery 26.

The respective sensors, including the residual amount detecting sensor 51, are connected to the power supply system control device 50 through the respective wirings 51a, 52a, 53a, 54a, 55a, 56a, 57a and send the detected values to the power supply system control device 50 as electric signals. The fuel cell 25 and the power supply system control device 50 are also connected to each other through wiring 58. The electric circuit 48 and the power supply system control device 50 are connected to each other through wiring 59. Accordingly, the respective amounts of voltage of the fuel cell 25 and the electric circuit 48 can be detected via wirings 58, 59.

Wirings 61, 62, 63, 64, 65, 66, 67 connect the power supply system control device 50 to the air blower 37, the valve 33, the circulating pump 34, the fan 27b, the water pump 28, the booster 46 and the drive motor 43, respectively, for sending command signals from the power supply system control device 50 to these components. However, in other embodiments, communication between the power supply control device 50 and the various components (e.g., air blower 37, valve 33, circulating pump 34, fan 27b, water pump 28, booster 46 and drive motor 43) can be done via a wireless connection (e.g., Rf communication). The air blower 37 operates in response to a flow amount command signal from the power supply system control device 50 to supply air to the fuel cell 25. The valve 33 selectively opens and closes in response to an operation command signal from the power supply system control device 50 to allow supply of hydrogen gas from the hydrogen tank 31 to the fuel cell 25.

The fuel cell 25 makes the oxygen and hydrogen supplied by the air blower 37 and hydrogen tank 31, respectively, react with each other to generate electricity as well as water. The booster 46 boosts the electricity generated by the fuel cell 25 in response to a voltage command signal from the power supply system control device 50 to send the electricity to the drive motor 43, as well as to the secondary battery 26 to charge the secondary battery 26. The circulating pump 34 operates in response to an operation command signal from the power supply system control device 50 to return the hydrogen gas that has not reacted with oxygen in the fuel cell 25 to the gas delivery pipe 32a through the gas delivery pipe 32b so that the unreacted hydrogen gas can mix with the hydrogen gas flow being supplied though the gas delivery pipe 32a.

In one embodiment, the water pump 28 operates in response to an operation command signal from the power supply system control device 50 to circulate the coolant between the radiator 27 and the fuel cell 25 to keep the temperature of the fuel cell 25 at a predetermined temperature. The fan 27b operates in response to an operation command signal from the power supply system control device 50 to direct airflow over the radiator 27 to cool the radiator 27. The drive motor 43 receives an operation signal generated in accordance with an operational amount of the accelerator, and operates in response to the operation signal. Additionally, the electric power generated by the fuel cell 25 is directed to the secondary battery 26 to charge the secondary battery 26, and is directed from the secondary battery 26 to the drive motor 43 as auxiliary power whenever the drive motor 43 requires additional power.

The power supply system control device 50 can have a CPU, RAMs, ROMs, a timer and so forth. Various programs and data such as, for example, previously prepared maps can be stored in the ROMs. The CPU controls the drive motor 43, the valve 33, the air blower 37, the water pump 28, etc. based on the operation of the grip or the like by the rider or the programs, etc. that have been previously prepared. In addition, the motorcycle 10 has a power switch (not shown) for starting operation of the motorcycle 10.

In this construction, when the rider drives the motorcycle 10, the rider, first, straddles the seat 35 to sit thereon. Then, the rider operates the power switch to bring to the ON state. Thereby, air is supplied from the air blower 37, and hydrogen is supplied from the hydrogen tank 31, to the fuel cell 25. The oxygen in the air and hydrogen react within the fuel cell 25 to generate electricity and produce water. The water pump 28 delivers coolant from the radiator 27 to cool the fuel cell 25 so as to keep the fuel cell 25 at the predetermined temperature. Also, the fuel-cell system 25 releases the water generated by the reaction of oxygen with hydrogen into the environment along with the exhaust air (e.g., water vapor).

In one embodiment, before the temperature of the fuel cell 25 reaches the suitable temperature for its operation, the power supply system control device 50 executes the program shown in FIG. 3 to have the fuel cell 25 generate power in a manner proper for the warm-up mode. After the warm-up mode is completed, the power supply system control device 50 allows the fuel cell 25 to generate power in a manner proper for the normal operation mode. In one embodiment, the program for controlling the operation of the fuel cell 25 to generate power generation can be stored in the ROMs and be repeatedly executed at predetermined intervals by the CPU after the power switch is brought to the ON state. As shown in FIG. 3, the program starts at a step 100 and goes to a step 102 to measure load voltage and load current of the drive motor 43. An amount of the load current at this moment is obtained by a detection value of the current sensor 56, while an amount of the load voltage at the moment is provided via the wiring 59. Therefore, the electric power to be consumed by the drive motor 43 can be accurately calculated so that the power generation amount of the fuel cell 25 can be set to a proper level.

Next, the program goes to a step 104 to calculate a power amount that is required by the drive motor 43 using the detected load current and load voltage obtained at the step 102. The necessary power amount can be provided by multiplying the amount of the load current and the amount of the load voltage. Then, at a step 106, the temperature of the fuel cell 25 is detected by the temperature sensor 53 and, at a step 108, it is determined whether a renewal flag KF, described below, is "1" or not.

The renewal flag KF indicates whether a renewal process of the power generation amount, which will be described later, needs to be made because a predetermined time elapses, or need not yet be made. The renewal flag KF is set to "1" at the moment of the program's start. Accordingly, at the step 108, the determination "YES" is made, and the program goes to a step 110. At the step 110, it is determined whether the temperature of the fuel cell 25 obtained at the step 106 is lower than (or equal to) a threshold temperature or not. The threshold temperature can be previously set and stored in the ROMs, and in one embodiment can be set to, for example, about 70° C. at which temperature the warm-up almost completes.

At this moment, if the temperature of the fuel cell 25 detected by the temperature sensor 53 is not higher than the threshold amount and the determination "YES" is made at the step 110, the program goes to a step 112. At the step 112, a warm-up mode power generation amount map is selected for reference from the maps (see FIG. 4), which can be previously prepared and stored in the ROMs. That is, the map shown in FIG. 4 indicates power generation amounts of the fuel cell 25 versus necessary power amounts of the drive motor 43 calculated at the step 104. The chain one-dashed line "a" indicates a one-to-one relationship between the power generation amounts of the fuel cell 25 and the necessary power amounts.

The dashed line "b" in FIG. 4 indicates the warm-up mode power generation amount map, showing power generation amount of the fuel cell 25. In the warm-up mode, the power generation amounts of the fuel cell 25 are larger than the power amounts necessary for the operations of the drive motor 43. As thus set, not only the power generation amount of the fuel cell 25 but also the heat generation amount increases. Consequently, the temperature of the fuel cell 25 rises at the earliest stage to provide a proper operating condition. The surplus power amount that is not used for the operation of the drive motor 43 is used to charge the secondary battery 26. Next, the program goes to a step 114 to control the FC auxiliary devices (the air blower 37, the valve 33, the water pump 28, etc.) that make the fuel cell 25 operate. Thereby, the fuel cell 25 generates a power generation amount corresponding to the necessary power amount on the dashed line "b" of FIG. 4 and being calculated at the step 104.

Next, at a step 122, the renewal flag KF is set to "0." The program, then, goes to a step 124 to determine whether the power generation amount of the fuel cell 25 needs to be renewed or not. This determination is made by comparing an elapsing time measured by the timer with the preset time. The preset time is set so as to be short enough to exist within a range in which the power generation amount does not abruptly change and the respective FC auxiliary devices are not excessively burdened. At this moment, if the elapsing time does not reach the preset time and the determination "NO" is made at the step 124, the program goes to a step 128 and temporarily ends.

The program then begins again at step 100. In the executions, again, the necessary power amount is provided by the processes of the steps 102, 104, and the temperature of the fuel cell 25 is provided by the process of the step 106. At the step 108, it is determined whether the renewal flag KF is "1" or not. On this occasion, the determination "NO" is made because the renewal flag KF is set to "0" at the step 122 in the previous executions of the program. The program then goes to a step 116. At step 116, the same control as the control of the FC auxiliary devices made at the step 114 is made. Accordingly, the process that makes the fuel cell 25 generate the power amount corresponding to the necessary power amount described above continues.

The program goes to the step 124 to determine whether the power generation amount of the fuel cell 25 needs to be renewed or not. At this moment, if the elapsing time does not reach the preset time and the determination "NO" is made at the step 124, the program goes to the step 128 to temporarily ends. The steps 100 to 108, 116, 124 and 128 are repeated until the time elapses to reach the preset time and the determination "YES" is made at the step 124. When the elapsing time reaches the preset time and the determination "YES" is made, the program goes to the step 126 to set the renewal flag KF to "1."

The program goes to the step 128 to end. Again, the program starts at and from the step 100 to execute the steps 102 to 106. Then, at the step 108, the determination whether the renewal flag KF is "1" or not is made. On this occasion, because the renewal flag KF is set to "1" in the previous executions of the program, the determination "YES" is made. The program goes to 110. At the step 110, it is determined whether the temperature of the fuel cell 25 is not higher than the threshold temperature.

If the temperature of the fuel cell 25 is still lower than the threshold amount and the determination "YES" is made at the step 110, the program goes to the step 112 to select the warm-up mode power generation amount map indicated by the dashed line "b" of FIG. 4. The program then goes to the step 114 to control the FC auxiliary devices so as to make the fuel cell 25 generate the power amount corresponding to the necessary power amount on the dashed line "b" of FIG. 4. The power generation amount at this moment is the amount that is used for reference and renewed at the step 112.

The program then goes to the step 122 to set the renewal flag KF to "0." The program goes to the step 124 to determine whether the elapsing time starting from the end of the process of the step 114 reaches the preset time or not. At this moment, if the elapsing time does not reach the preset time and the determination "NO" is made at the step 124, the program goes to the step 128 to temporarily ends. Again the program starts at and from the step 100 and the steps 100 to 108, 116, 124 and 128 are repeated until the elapsing time reaches the preset time and the determination "YES" is made.

When the elapsing time reaches the preset time, the power generation amount is renewed in the next executions of the steps of the program. The steps 100 to 116 and 122 to 128 are repeated until the temperature of the fuel cell 25 detected by the temperature sensor 53 reaches the threshold temperature and the determination "NO" is made at the step 110. During the period, the fuel cell 25 generates the electric power based on the warm-up mode power generation amount map indicated by the dashed line "b" of FIG. 4. Relationship between the power generation amounts of the fuel cell 25 and the charge amounts of the secondary battery 26, while in the warm-up operation mode, are shown in a left portion of FIG. 5.

That is, as indicated by the dashed line area "d" of FIG. 5, the power generation amount of the fuel cell 25 is large in the warm-up mode. On the other hand, the surplus of the power generated by the fuel cell 25 is charged into the secondary battery 26 so that the charge amount gradually increases as indicated by the dashed line area "e" of FIG. 5. Consequently, the secondary battery 26 approaches the full charge condition at a time around the end of the warm-up mode. When the temperature of the fuel cell 25 detected by the temperature sensor 53 reaches the threshold amount and the determination "NO" is made at the step 110, the program goes to a step 118.

At the step 118, the normal operation mode power generation amount map indicated by the solid line "c" of FIG. 4 is selected for reference. That is, solid line "c" indicates the power generation amounts of the normal operation mode. In the normal operation mode, the power generation amount of the fuel cell 25 is set to be smaller than the power amount calculated at the step 104 and needed for the operation of the drive motor 43. A shortage of electric power necessary for the operation of the drive motor 43 is supplemented by the secondary battery 26. Therefore, the secondary battery 26 keeps a charge condition that is sufficiently lower than the fully charged condition, which aids in prolonging the life of the secondary battery 26.

Next, the program goes to a step 120 to control the operations of the FC auxiliary devices so as to make the fuel cell 25 operate in the normal operation mode. Thereby, the fuel cell 25 generates the power amount corresponding to the necessary power amount on the solid line "c" of FIG. 4. Then, at. the step 122, the renewal flag KF is set to "0." At the subsequent step 124, it is determined whether the power generation amount needs to be renewed or not. If the elapsing time does not reach the preset time and the determination "NO" is made at the step 124, the program goes to the step 128 to temporarily end.

As discussed above, the steps 100 to 108, 116, 124 and 128 are repeated until the elapsing time reaches the preset time and the determination "YES" is made at the step 124. On this occasion, the same control as the control of the FC auxiliary devices made at the previous step 120 is made at the step 116; thereby, the process that makes the fuel cell 25 generate the power amount corresponding to the necessary power amount described above continues.

When the elapsing time reaches the preset time, the determination "YES" is made at the step 124. The program goes to the step 126 to set the renewal flag KF to "1."The program then goes to the step 128 to temporarily end. Again, the executions by the program start at and from the step 100. Afterwards, the steps 102-110, 116 and 118-128 are repeated. The processes are repeatedly made until the power switch is brought to the OFF condition. During the period, the fuel cell 25 generates the power amount corresponding to the necessary power amount on the solid line "c" of FIG. 4.

Relationships between the power generation amounts of the fuel cell 25 and the charge amounts of the secondary battery 26, while in the normal operation mode, are shown in a center portion of FIG. 5. That is, as indicated by the dashed line area "f" of FIG. 5, the power generation amounts of the fuel cell 25 are smaller than the power generation amounts in the warm-up mode. The power generation amount is set to be smaller than the power amount used for the operation of the drive motor 43 and greatly falls after the warm-up completes. Meanwhile, the secondary battery 26 makes up for the shortage of the power generated by the fuel cell 25 and provided to the drive motor 43. Thus, the charge amount of the secondary battery 26 gradually decreases as indicated by the dashed line area "g" of FIG. 5.

During the period in which the processes discussed above are executed, the motorcycle 10 repeats acceleration and deceleration in response to the operation of the grip (e.g., torque or power request from the accelerator). If the running speed of the motorcycle 10 needs to be lowered, the brake levers are operated as needed. Thereby, the motorcycle 10 reduces its speed in response to the operation amounts of the brake levers. When the rider wants to finish driving the motorcycle 10, the rider brings the power switch to the OFF condition. The rider also pivots the stand 45 downward to make it touch the ground. Thereby, the motorcycle 10 stays in the standing state.

Relationships between the power generation of the hybrid power supply system S and the charge amounts of the secondary battery 26, while in the stop mode of operation, are shown in a right portion of FIG. 5. As shown in FIG. 5, the power generation amount becomes zero "0" simultaneously with a stop in the operation of the fuel cell 25. Because the secondary battery 26 is neither being charged by the fuel cell 25 nor supplying power to the drive motor 43 while in the stop mode, the secondary battery 26 maintains the charge amount present when the power switch is moved to the OFF position, as indicated by the dashed line area "h" of FIG. 5. When the hybrid power supply system S is restarted, the power generation amount of the fuel cell 25 and the charge amount of the secondary battery 26 return to their respective initial states in the warm-up mode, as illustrated in FIG. 5.

As thus described, when the temperature of the fuel cell 25 is not higher than the threshold temperature while in the warm-up mode of the hybrid power supply system S of this embodiment, the power generation amount of the fuel cell 25 is increased more than the corresponding necessary power amount for the operation of the drive motor 43. Therefore, the heat generation amount of the fuel cell 25 can be increased in proportion to the power generation amount. The fuel cell 25 can thus be warmed up faster to change to the normal operation mode from the warm-up mode. Because the surplus electric power generated by the fuel cell 25 that is not consumed by the drive motor 43 is used to charge the secondary battery 26, the electric power generated by the fuel cell 25 is not wasted. Additionally, because devices such as a heater, for example, are not required to warm-up the fuel cell 25, the hybrid power supply system S can be more compact.

When the hybrid power supply system S switches to the normal operation mode after the warm-up mode is completed, the electric power generated by the fuel cell 25 is smaller than the power consumed by the drive motor 43. In one embodiment, the electric power generated by the fuel cell 25 becomes smaller than the power consumed by the drive motor 43 after a preset time following the completion of the warm-up mode and the hybrid power supply system S switches to the normal operation mode. The secondary battery 26 then supplements the fuel cell 25 to provide the power required by the drive motor 43 (e.g., the secondary battery 26 provides a power amount equal to the difference between the electric power generated by the fuel cell 25 and the power consumed by the drive motor 43). Accordingly, during the normal operating mode the secondary battery 26 can be at a charge condition that is sufficiently less than the full charge condition. The secondary battery 26 is thus prevented from being excessively charged so it can have a long life. Further, when the fuel cell 25 generates electric power, a power generation amount map corresponding to the particular mode (e.g., warm-up mode or normal operation mode) can be used for reference to renew the power generation amount at the predetermined intervals, i.e., in keeping regular intervals.

Thereby, when the necessary power for the drive motor 43 abruptly changes, the power generation amount can be slowly increased. That is, the charge amount of the secondary battery 26 can slowly change relative to the load given when the power necessary for the drive motor 43 abruptly changes. The power generated by the fuel cell 25 can thus be periodically and slowly changed. As a result, the FC auxiliary devices of the fuel cell 25 and devices for the control system provided to the hybrid power supply system S are not required to have severe transitional characteristics. The hybrid power supply system S thus can made more compact and weight reduction thereof can be realized. In one embodiment, because the secondary battery 26 is formed with a lithium ion battery, a compact secondary battery 26 having a large energy density is obtained. The deterioration of the lithium ion battery would likely be expedited when the battery is almost fully charged under high temperature circumstances. However, in the embodiments herein, the charge amount of the secondary battery 26 is kept at a desirable level. Thus, using the lithium ion battery as the secondary battery 26 advantageously provides a superior battery. Also, because the hybrid power supply system S is used as the power supply system of the motorcycle 10, the motorcycle 10 can have a short warm-up time and not waste any power generated by the fuel cell 25.

FIG. 6 shows another program for controlling the power generation amount of the fuel cell 25, in accordance with another embodiment. In one embodiment, this program is also stored in the ROMs provided to the power supply system control device 50 and is repeatedly executed at predetermined intervals by the CPU after the power switch is brought to the ON state. The program first starts at a step 200 and goes to a step 202 to measure load voltage of the secondary battery 26. An amount of the load voltage is provided via the wiring 59 that connects the electric circuit 48 to the power supply system control device 50.

Next, the program goes to a step 204 to measure current of the secondary battery 26. An amount of this current is detected by the current sensor 57. Then, at a step 206, it is determined whether the amount of current of the secondary battery 26 of the fuel cell 25 obtained at the step 204 is not higher than a threshold amount. In on embodiment, the threshold amount can be previously stored in the ROMs and can be set to be, for example, 2A. If the current of the secondary battery 26 detected by the current sensor 57 is not higher than the threshold amount and the determination "YES" is made, the program goes to a step 208.

At step 208, a charge amount of the secondary battery 26 is obtained from the voltage amount obtained at the step 202. The charge amount can be obtained based on a map (not shown) indicating relationships between voltage amounts and charge amounts. Then, at a step 210, the temperature of the fuel cell 25 detected by the temperature sensor 53 is measured. At a step 212, it is determined whether the renewal flag KF is "1" or not. Like the renewal flag KF of the program of FIG. 3 described above, this renewal flag KF indicates whether a renewal process, which will be described later, needs to be made because a predetermined time has elapsed, or need not yet be made. The renewal flag KF is set to "1" at the moment of the program's start.

Accordingly, at step 212, if the determination "YES" is made, the program goes to a step 214. At step 214, it is determined whether the temperature of the fuel cell 25 obtained at the step 210 is not higher than a threshold temperature or not. The threshold temperature can be previously set and stored in the ROMs, and in one embodiment can be the same as the threshold temperature amount at step 110 of the program of FIG. 3 described above.

If the temperature of the fuel cell 25 detected by the temperature sensor 53 is not higher than the threshold temperature, and the determination "YES" is made at the step 214, the program goes to a step 216. At step 216, a warm-up mode power generation amount map is selected for reference from the maps (see FIG. 7), which can be previously made and stored in the ROMs. That is, the map shown in FIG. 7 indicates power generation amounts of the fuel cell 25 versus charge amounts of the secondary battery 26.

The dashed line "i" of FIG. 7 is a warm-up mode power generation amount map indicating power generation amounts of the fuel cell 25 in the warm-up mode, while the solid line "j" is an operation mode power generation amount map indicating power generation amounts of the fuel cell 25 in the normal operation mode. In the illustrated embodiment of FIG. 7, the power generation amount of the fuel cell 25 in the warm-up mode is larger than the power generation amount of the fuel cell 25 in the normal operation mode. Therefore, the heat generation amount of the fuel cell 25 increases in the warm-up mode and the temperature of the fuel cell 25 rises to reach a desirable operating condition at the earliest stage.

While in the warm-up mode, the surplus power generated by the fuel cell 25 is used to charge the secondary battery 26.

Next, the program goes to a step 218 and then executes processes of the steps 228 to 234. Because the processes at the steps 218 and 228 to 234 are the same as the steps 114 and 122 to 128 of the program of FIG. 3 described above, except that they are executed referring to the warm-up mode power generation amount map (charge amounts are based on voltage amounts of the secondary map) indicated by the dashed line "i" used for reference at step 216, descriptions thereof are not repeated. After the processes of steps 218 and 228 to 234 complete, the program temporarily ends.

Again, the program starts from step 200. Once again, the voltage of the secondary battery 26 is measured at step 202, and the current of the secondary battery 26 is measured at step 204. At step 206, it is determined whether the amount of current of the secondary battery 26 is not higher than the threshold temperature. If the current detected by the current sensor 57 is still not higher than the threshold amount, and the determination "YES" is made at step 206, the program goes to step 208. At step 208, a charge amount of the secondary battery 26 is obtained based on the voltage amount obtained at step 202.

Then, at step 210, the fuel cell 25 temperature is detected by the temperature sensor 53. At step 212, it is again determined whether the renewal flag KF is "1" or not. On this occasion, if the determination "NO" is made at step 230 in the previous executions of the program and the process at step 232 has not been executed, the renewal flag KF is kept to be "0" by the process at step 228. Therefore, the determination "NO" is made at step 212 and the program goes to a step 220. At step 220, the same control as the FC auxiliary devices' control made at step 218 is made to continue the process in which the fuel cell 25 generates the power amount corresponding to the necessary power amount described above. The steps 200 to 212, 220, and 230 to 234 are repeated until the determination "YES" is made at step 230.

When the determination "YES" is made at step 230, the renewal flag KF is set to "1" at step 232. The determination "YES" is made at step 212 in the next executions of the program. Afterwards, the FC auxiliary devices are controlled based on the renewed power generation amount. As long as the determination "YES" is made at steps 206 and 214, the warm-up mode process based on the voltage amount of the secondary battery 26 is repeated while renewing the power generation amount at predetermined intervals. When the amount of current of the secondary battery 26 detected by the current sensor 57 increases above the threshold amount and the determination "NO" is made at step 206, the program goes to a step 222.

At step 222, a charge amount of the secondary battery 26 is obtained from an integration value of the amounts of current obtained at step 204. The integration value is equal to amounts of current integrated and stored into the RAMs as data during every execution of the program by the power supply system control device 50. Then, at step 210, the temperature of the fuel cell 25 is detected by the temperature sensor 53. At step 212, it is determined whether the renewal flag KF is "1" or not. If the determination that the renewal flag KF is "1" is made, the program goes to the step 214 to determine whether the temperature of the fuel cell 25 is not higher than the threshold temperature.

If the temperature of the fuel cell 25 detected by the temperature sensor 53 does not reach the threshold amount and the determination "YES" is made at step 214, the program goes to step 216. Afterwards, steps 218 and 228-234 described above are executed. As long as the determination "NO" is made at the step 206 and the determination "YES" is made at the step 214, the warm-up mode processes based on the integration amount of current of the secondary battery 26 are executed. During this period, the fuel cell 25 generates electric power based on the warm-up mode power generation amount map indicated by the dashed line "i" of FIG. 7.

When the temperature of the fuel cell 25 detected by the temperature sensor 53 reaches the threshold temperature and the determination "NO" is made at step 214, the program goes to a step 224. At step 224, the normal operation mode power generation amount map indicated by the solid line "j" of FIG. 7 is selected for reference. That is, the solid line "j" indicates power generation amounts in the normal operation mode. As shown in FIG. 7, the power generation amount of the fuel cell 25 in the normal operation mode is smaller than the power generation amount thereof in the warm-up mode. In the normal operation mode, the secondary battery 26 supplements a shortage of the power amount necessary for the operation of the drive motor 43.

Next, the program goes to a step 226 to control the operations of the respective FC auxiliary devices so as to operate the fuel cell 25 in the normal operation mode. Thereby, the fuel cell 25 generates a power amount corresponding to a charge amount of the secondary battery 26 based on the solid line "j" of FIG. 7. At step 228, it is determined whether the renewal flag KF is set to "0," and then the program goes to step 230 to determine whether the power generation amount needs to be renewed. If the elapsing time does not reach the preset time and the determination "NO" is made at step 230, the program temporarily ends. Again, the program starts at and from the step 200. Afterwards, the steps 202 to 206, 220, 222, 210 to 214 and 224 to 234 are repeated. Those steps are repeated until the power switch is brought to the OFF condition. During this period, the fuel cell 25 generates a power generation amount corresponding to a charge amount of the secondary battery 26 based on the solid line "j" of FIG. 7.

Relationships between the power generation amounts of the fuel cell 25 and the charge amounts of the secondary battery 26 in the executions of the program of FIG. 6 are generally the same as those shown in the graph of FIG. 5. Therefore, the power generation amount of the fuel cell 25 in the warm-up mode and the power generation amount of the fuel cell 25 in the normal operation mode can be individually adjusted in response to the amount of the voltage or the integration amount of current of the secondary battery 26. The charge amount of the secondary battery 26 thus can be kept within a predetermined range. The secondary battery 26 thus has no excessive burden. That is, the power generation amount of the fuel cell 25 can be adjusted based on the charge amount calculated by the power supply system control device 50 based on the voltage, or the charge amount calculated by the power supply system control device 50 based on the current, by the determination whether the amount of current of the secondary battery 26 is larger than the threshold amount, in addition to the determination whether the temperature of the fuel cell 25 is higher than the threshold temperature. A more minute control thus can be made.

In another embodiment, the hybrid power supply system includes a program, or other suitable means, for inhibiting the power supply system control device 50 from increasing the electric power generated by the fuel cell 25 above the electric power consumed by the drive motor 43 when the charge amount of the secondary battery 26 estimated based on the measured voltage load of the battery 26 is larger than a predetermined amount. Accordingly, deterioration of the operation of the secondary battery 26 can be avoided because the secondary battery 26 is not excessively charged. That is, the charge amount of the secondary battery 26 is smaller than the charge amount at start-up if the estimated charge amount is larger than a predetermined charge amount.

FIG. 8 shows relationships between the power generating amounts of the fuel cell 25 and the charge amounts of the secondary battery 26 in the processes such that the charge amount of the secondary battery 26 obtained at the step 208 is a large amount that is close to the full charge amount. In this state, the warm-up processes are omitted and the control of the normal operation mode is made from the initial stage. That is, as indicated by the dashed line area "k" in FIG. 8, the power generation amount of the fuel cell 25 varies with fluctuations which go up and down within a range that is slightly less than the electric power used for the operation of the drive motor 43. When the charge amount of the secondary battery 26 reaches the predetermined amount, the power generation amount is controlled to be the same amount as the power amount that is used for the operation of the drive motor 43.

Meanwhile, the secondary battery 26 supplements the electric power generated by the fuel cell 25 to the drive motor 43. The charge amount of the secondary battery 26 thus gradually decreases as indicated by the dashed line area "1" of FIG. 8. This charge amount decreases greatly when the fuel cell 25 starts, and then settles at almost a constant value with the preset time elapsing. Therefore, the secondary battery 26 does not need to be an excessively highly charged condition. Thus, the deterioration of the secondary battery 26 as well as excessive charge thereof can be inhibited.

The hybrid power supply system is not limited to the embodiments described above and can include other embodiments. For example, in the embodiments described above, the hybrid power supply system S is mounted to the motorcycle 10. However, devices to which this hybrid power supply system is applied are not limited to the motorcycle 10 and can include vehicles such as, for example, a three-wheeled motored vehicle and a four-wheeled motored vehicle and devices other than the vehicles which uses electric power. Also, in the embodiment described above, the control that omits the warm-up processes if the initial charge amount of the secondary battery 26 is large can be used in the program of FIG. 6. However, this control can be applied to the program of FIG. 3 by providing a step in which the charge amount of the secondary battery is calculated.

The current sensors 55, 56, 57 for detecting the current flowing through the electric circuit 48 are provided in the embodiments described above. However, any one of the current sensors 55, 56, 57 may be omitted. Voltage sensors may be provided in the wirings 58, 59. Thereby, the voltage can be accurately detected. In the embodiments above, the temperature of the fuel cell 25 is measured and it is determined whether the sensed temperature is not higher than the threshold temperature in the flowchart of FIG. 3 described above. The temperature that is sensed, however, may be the temperature of the coolant of the radiator 27 detected by the temperature sensor 52. Also, the other components forming the hybrid power supply system S of the present invention can be properly changed, any one of the components can be omitted, or any other components can be added.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. A hybrid power supply system comprising:
a fuel cell configured to react hydrogen gas supplied from a hydrogen supply device with oxygen gas supplied from an oxygen supply device to generate electric power;
an operating device electrically connected to the fuel cell, the operating device operated using the electric power generated by the fuel cell;
a cooling device delivering coolant to the fuel cell to cool the fuel cell;
a temperature monitor sensing a temperature of the fuel cell or a temperature of the coolant;
a controller configured to control the electric power generated by the fuel cell in such a manner that the generated electric power is larger than electric power consumed by the operating device during a warm-up mode in which the temperature sensed by the temperature monitor is not higher than a predetermined threshold temperature; and
a secondary power storage device electrically connected to the fuel cell and the operating device, whereby a supply of electric power generated by the fuel cell and not consumed by the operating device is used to charge the secondary power storage device.

2. The hybrid power supply system of claim 1, wherein the controller controls the fuel cell to generate an amount of electric power that is smaller than the electric power consumed by the operating device after a preset time following completion of the warm-up mode and transition of the hybrid power supply system into a normal operation mode, the controller controlling the operation of the secondary power storage device to supply electric power to the operating device to supplement the electric power supplied from the fuel cell to the operating device, so as to provide the electric power required by the operating device.

3. The hybrid power supply system of claim 1, further comprising:
an output current detector configured to measure an output current of the operating device;
an output voltage detector configured to measure an output voltage of the operating device; and
an electric power calculating device configured to calculate an amount of electric power to be consumed by the operating device based on the amount of current measured by the output current detector and the amount of voltage measured by the output voltage detector.

4. The hybrid power supply system of claim 1, further comprising:
a voltage measuring device for measuring a voltage of the secondary power storage device;
a current measuring device for measuring a current of the secondary power storage device;
a voltage-basis charge amount calculating device for calculating a charge amount of the secondary power storage device using the amount of voltage of the secondary power storage device measured by the voltage measuring device; and a current-basis charge amount calculating device for calculating a charge amount of the secondary power storage device by integrating amounts of current that are charged to and discharged from the secondary power storage device using the amount of current measured by the current measuring device, wherein the controller determines a power generation amount of the fuel cell based on the charge amount calculated by the voltage-basis charge amount calculating device when the current measured by the current measuring device is not larger than a predetermined threshold current, and the controller determines the power generation amount of the fuel cell based on the charge amount calculated by the current-basis charge amount calculating device when the amount of current measured by the current measuring device is larger than the predetermined threshold current.

5. The hybrid power supply system of claim 4 further comprising means for inhibiting the controller from operating the fuel cell to generate more electric power than the electric power consumed by the operating device when the charge amount of the secondary power storage device calculated by the voltage-basis charge amount calculating device is larger than a predetermined amount.

6. The hybrid power supply system of claim 1, further comprising:

a storage device configured to communicate with a controller, the storage device containing a warm-up mode power generation amount map accessible and usable by the controller during the warm-up mode, where the temperature of the fuel cell or the temperature of the coolant is not higher than the predetermined threshold temperature, the storage device also containing a normal operation mode power generation amount map for use by the controller during the normal operation mode, where the temperature of the fuel cell or the temperature of the coolant is higher than the predetermined threshold temperature; and a timer, wherein the controller accesses and uses one of the warm-up mode power generation amount map and the normal operation mode power generation amount map, depending on the existing mode of operation, to renew a power generation amount of the fuel cell at predetermined intervals of time measured by the timer.

7. The hybrid power supply system of claim 1, wherein the secondary power storage device is a lithium ion battery.

8. The hybrid power supply system of claim 1, wherein the operating device is a drive motor for a motorcycle, a three-wheeled motored vehicle or a four-wheeled motored vehicle.

9. A hybrid power supply system, comprising:

a fuel cell configured to react hydrogen and oxygen to generate electric power;

a drive motor coupled to the fuel cell, the drive motor configured to operate using electric power generated by the fuel cell;

a temperature sensor configured to measure a temperature of the fuel cell;

a controller configured to control the operation of the fuel cell so that the electric power generated by the fuel cell is larger than the electric power demand of the drive motor during a warm-up mode in which the measured temperature is at or below a predetermined threshold temperature; and a secondary power storage device electrically connected to the fuel cell and the drive motor.

10. The system of claim 9, wherein a supply of electric power generated by the fuel cell that is not consumed by the drive motor is used to charge the secondary power storage device.

11. The system of claim 9, wherein the controller controls the operation of the fuel cell so that the electric power generated by the fuel cell is smaller than the electric power demand of the drive motor during a normal operation mode in which the measured temperature is above the predetermined threshold temperature.

12. The system of claim 11, wherein the controller transitions operation of the fuel cell from the warm-up mode to the normal operation mode after a preset time following completion of the warm-up mode.

13. A method for operating a hybrid power supply system having a fuel cell, comprising:

sensing a temperature of the fuel cell;

determining if the sensed fuel cell temperature is not above a threshold temperature; and determining an electric power generation amount for the fuel cell using a warm-up mode power generation map if the sensed temperature is not above the threshold temperature.

14. The method of claim 13, further comprising determining the electric power generation amount for the fuel cell using a normal operation mode power generation map if the sensed temperature is higher than the threshold temperature.

15. The method of claim 14, further comprising:

measuring a load voltage of an electric motor coupled to the fuel cell;

measuring a load current of the electric motor; and calculating an electric power load required by the electric motor based on the measured load voltage and load current, wherein the determined electric power generation amount for the fuel cell corresponds to the electric power load of the electric motor.

16. The method of claim 15, wherein the warm-up mode power generation map and normal operation mode power generation map provide a fuel cell power generation amount as a function of the electric power load of the electric motor.

17. The method of claim 13, further comprising:

measuring a load voltage on a battery electrically connected to the fuel cell;

measuring a current of the battery;

determining if the current is not higher than a threshold current amount; and obtaining a battery charge amount corresponding to the measured load voltage if the measured current is not above the threshold current amount.

18. The method of claim 17, further comprising obtaining a battery charge amount based on an integration of the current values stored in a memory during operation of the hybrid power supply system.

19. The method of claim 17, wherein the warm-up mode power generation map provides a fuel cell power generation amount as a function of the battery charge amount.

20. The method of claim 17, further comprising inhibiting the electric power generation amount of the fuel cell from increasing above an electric power consumed by an operating device powered by the fuel cell when the charge amount of the battery calculated based on the measured load voltage of the battery is larger than a predetermined amount.

* * * * *